(12) United States Patent
Richter et al.

(10) Patent No.: US 9,652,810 B2
(45) Date of Patent: May 16, 2017

(54) DYNAMIC CHAT BOX

(75) Inventors: Michael Judd Richter, Atherton, CA (US); Matthew William Kelly, Palo Alto, CA (US); Austin Haugen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 411 days.

(21) Appl. No.: 13/168,808

(22) Filed: Jun. 24, 2011

(65) Prior Publication Data

US 2012/0331067 A1 Dec. 27, 2012

(51) Int. Cl.
| | | |
|---|---|---|
| G06F 15/16 | (2006.01) | |
| G06F 3/00 | (2006.01) | |
| G06Q 50/00 | (2012.01) | |
| G06Q 10/10 | (2012.01) | |

(52) U.S. Cl.
CPC ........... *G06Q 50/01* (2013.01); *G06Q 10/107* (2013.01)

(58) Field of Classification Search
CPC .............................. G06Q 50/01; G06Q 10/107
USPC .................. 709/205, 204, 206; 715/738, 751
See application file for complete search history.

(56) References Cited

U.S. PATENT DOCUMENTS

| | | | |
|---|---|---|---|
| 6,434,599 B1 * | 8/2002 | Porter | 709/204 |
| 6,865,599 B2 * | 3/2005 | Zhang | 709/218 |
| 7,702,653 B1 | 4/2010 | Tan | |
| 7,788,260 B2 | 8/2010 | Lunt | |
| 7,890,501 B2 | 2/2011 | Lunt | |
| 7,945,861 B1 * | 5/2011 | Karam | 715/751 |
| 7,949,611 B1 | 5/2011 | Nielsen | |
| 8,239,364 B2 | 8/2012 | Wable | |
| 8,739,044 B1 * | 5/2014 | Varadarajan | 715/751 |
| 2002/0138624 A1 * | 9/2002 | Esenther | 709/227 |
| 2003/0028565 A1 * | 2/2003 | Landsman | G06Q 30/02 715/234 |
| 2003/0144898 A1 * | 7/2003 | Bibelnieks | G06Q 30/02 705/7.33 |
| 2003/0179222 A1 * | 9/2003 | Noma et al. | 345/700 |
| 2003/0187677 A1 * | 10/2003 | Malireddy | G06Q 30/02 705/7.37 |

(Continued)

FOREIGN PATENT DOCUMENTS

JP 2009-181260 8/2009

OTHER PUBLICATIONS

International Search Report and Written Opinion for PCT/US2012/040976, Dec. 26, 2012.

(Continued)

*Primary Examiner* — Philip Chea
*Assistant Examiner* — Wing Ma
(74) *Attorney, Agent, or Firm* — Baker Botts L.L.P.

(57) ABSTRACT

In particular embodiments, a method comprising, by one or more computing devices, communicating, from a client device, to a remote host a resource locator of a content object being currently accessed by a first user at the client device, receiving from the remote host an indication that one or more second users have accessed the content object or a domain hosting the content object, and responsive to the indication, displaying a chat messaging interface to the first user at the client device, wherein the chat messaging interface includes identifiers for the one or more second users and messaging controls operative to establish a chat session with the one or more second users.

21 Claims, 4 Drawing Sheets

(56) References Cited

U.S. PATENT DOCUMENTS

| | | | |
|---|---|---|---|
| 2003/0225836 A1* | 12/2003 | Lee et al. .................... 709/205 |
| 2005/0004985 A1 | 1/2005 | Stochosky |
| 2005/0198031 A1 | 9/2005 | Pezaris |
| 2006/0004892 A1 | 1/2006 | Lunt |
| 2006/0026233 A1* | 2/2006 | Tenembaum et al. ........ 709/205 |
| 2006/0253432 A1* | 11/2006 | Eagle et al. ..................... 707/3 |
| 2007/0061412 A1* | 3/2007 | Karidi et al. ................. 709/217 |
| 2007/0214121 A1 | 9/2007 | Ebanks |
| 2007/0282950 A1 | 12/2007 | Fischer |
| 2007/0300149 A1* | 12/2007 | Bryant ............. G06F 17/30893 715/203 |
| 2008/0005223 A1 | 1/2008 | Flake |
| 2008/0016164 A1 | 1/2008 | Chandra |
| 2008/0034040 A1 | 2/2008 | Wherry |
| 2008/0040673 A1* | 2/2008 | Zuckerberg et al. ......... 715/745 |
| 2008/0065604 A1* | 3/2008 | Tiu et al. ........................ 707/3 |
| 2008/0114875 A1* | 5/2008 | Anastas et al. ............... 709/224 |
| 2008/0134040 A1* | 6/2008 | Pennington et al. ......... 715/733 |
| 2008/0243830 A1 | 10/2008 | Abhyanker |
| 2009/0106822 A1 | 4/2009 | Obasanjo |
| 2009/0249244 A1 | 10/2009 | Robinson |
| 2009/0254843 A1 | 10/2009 | Wie |
| 2009/0287645 A1 | 11/2009 | Dasdan |
| 2010/0023584 A1 | 1/2010 | Kamdar |
| 2010/0023868 A1* | 1/2010 | Bonforte et al. ............. 715/738 |
| 2010/0082746 A1* | 4/2010 | Ulrich et al. ................. 709/204 |
| 2010/0088607 A1* | 4/2010 | Dumpeti et al. ............. 715/739 |
| 2010/0132049 A1 | 5/2010 | Vernal |
| 2010/0177696 A1 | 7/2010 | Jung |
| 2010/0185951 A1* | 7/2010 | Nichols et al. ............... 715/738 |
| 2010/0205541 A1* | 8/2010 | Rapaport et al. ............. 715/753 |
| 2010/0287134 A1* | 11/2010 | Hauser ............. G06Q 10/06375 706/54 |
| 2011/0022657 A1 | 1/2011 | Zhu |
| 2011/0055314 A1 | 3/2011 | Rosenstein |
| 2011/0061016 A1 | 3/2011 | Song |
| 2011/0066636 A1 | 3/2011 | Guido |
| 2011/0087658 A1 | 4/2011 | Lunt |
| 2011/0088039 A1 | 4/2011 | Tabone |
| 2011/0093460 A1 | 4/2011 | Lunt |
| 2011/0093498 A1 | 4/2011 | Lunt |
| 2011/0099167 A1 | 4/2011 | Galbreath |
| 2011/0099495 A1 | 4/2011 | Harrington |
| 2011/0119335 A1 | 5/2011 | Galbreath |
| 2011/0314386 A1 | 12/2011 | Jeong |
| 2012/0124486 A1* | 5/2012 | Robinson et al. ............. 715/753 |
| 2012/0158491 A1* | 6/2012 | Goulden et al. ........... 705/14.46 |
| 2012/0278343 A1 | 11/2012 | Steele |
| 2012/0290637 A1* | 11/2012 | Perantatos et al. ........... 709/203 |
| 2012/0317109 A1 | 12/2012 | Richter |
| 2013/0198285 A1 | 8/2013 | Ourega |

OTHER PUBLICATIONS

International Search Report and Written Opinion for PCT/US2012/038918, Nov. 30, 2012.
International Search Report and Written Opinion for PCT/US2012/038916, Dec. 20, 2012.
International Search Report and Written Opinion for PCT/US2012/038237, Dec. 6, 2012.
Office Action for U.S. Appl. No. 13/159,247, Apr. 1, 2013.
Office Action for U.S. Appl. No. 13/116,945, Apr. 26, 2013.
Office Action for U.S. Appl. No. 13/116,923, Apr. 18, 2013.
Office Action for U.S. Appl. No. 13/116,909, Mar. 15, 2013.
Office Action for U.S. Appl. No. 13/116,862, Jan. 31, 2013.
Final Office Action for U.S. Appl. No. 13/116,862, Jun. 13, 2013.
Final Office Action for U.S. Appl. No. 13/159,247, Oct. 11, 2013.
Final Office Action for U.S. Appl. No. 13/116,923, Nov. 15, 2013.
Final Office Action for U.S. Appl. No. 13/116,945, Nov. 20, 2013.
Notice of Allowance for U.S. Appl. No. 13/116,909, Nov. 20, 2013.
Office Action for U.S. Appl. No. 13/116,862, Feb. 14, 2014.
Notice of Allowance for U.S. Appl. No. 13/116,923, Apr. 10, 2014.
MX Office Action for Application No. MX/A/2013/014807, Feb. 18, 2015.
AU Patent Examination Report for Application No. 2012-258908, May 20, 2015.
Final Office Action for U.S. Appl. No. 13/116,862, Sep. 23, 2014.
Office Action for U.S. Appl. No. 13/116,945, Sep. 24, 2014.

* cited by examiner

DYNAMIC CHAT BOX

TECHNICAL FIELD

The present disclosure generally relates to social networking systems, and more specifically relates to connecting users of a social networking systems that are accessing third party websites.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may also create and store user preferences.

A social networking system may support application programming interfaces and associated functionality that allows third-party systems to access user profile data of its users. Such third party websites can use the user profile data can use the identity and account of a user for purposes of identifying users and maintaining their accounts at such third party websites. These third party websites may also access user profile data in order to personalize or customize the user experience on the site.

The advent of social networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, e-mail to multiple accounts, multiple instant messaging protocols, twitter messages, voice-over-IP (VoIP) calls, video chats, SMS and MMS messages, social networking messages, voicemail, push-to-talk (PTT), and dedicated notification-based message clients such as the Blackberry Messenger and Kik Messenger.

SUMMARY

The present disclosure generally relates to social networking systems, and more specifically relates to connecting users of a social networking systems that are accessing third party websites.

In particular embodiments, a method comprising, by one or more computing devices, communicating, from a client device, to a remote host a resource locator of a content object being currently accessed by a first user at the client device, receiving from the remote host an indication that one or more second users have accessed the content object or a domain hosting the content object, and responsive to the indication, displaying a chat messaging interface to the first user at the client device, wherein the chat messaging interface includes identifiers for the one or more second users and messaging controls operative to establish a chat session with the one or more second users.

These and other features, aspects, and advantages of the disclosure are described in more detail below in the detailed description and in conjunction with the following figures.

DESCRIPTION OF EXAMPLE EMBODIMENTS

Figure 1:
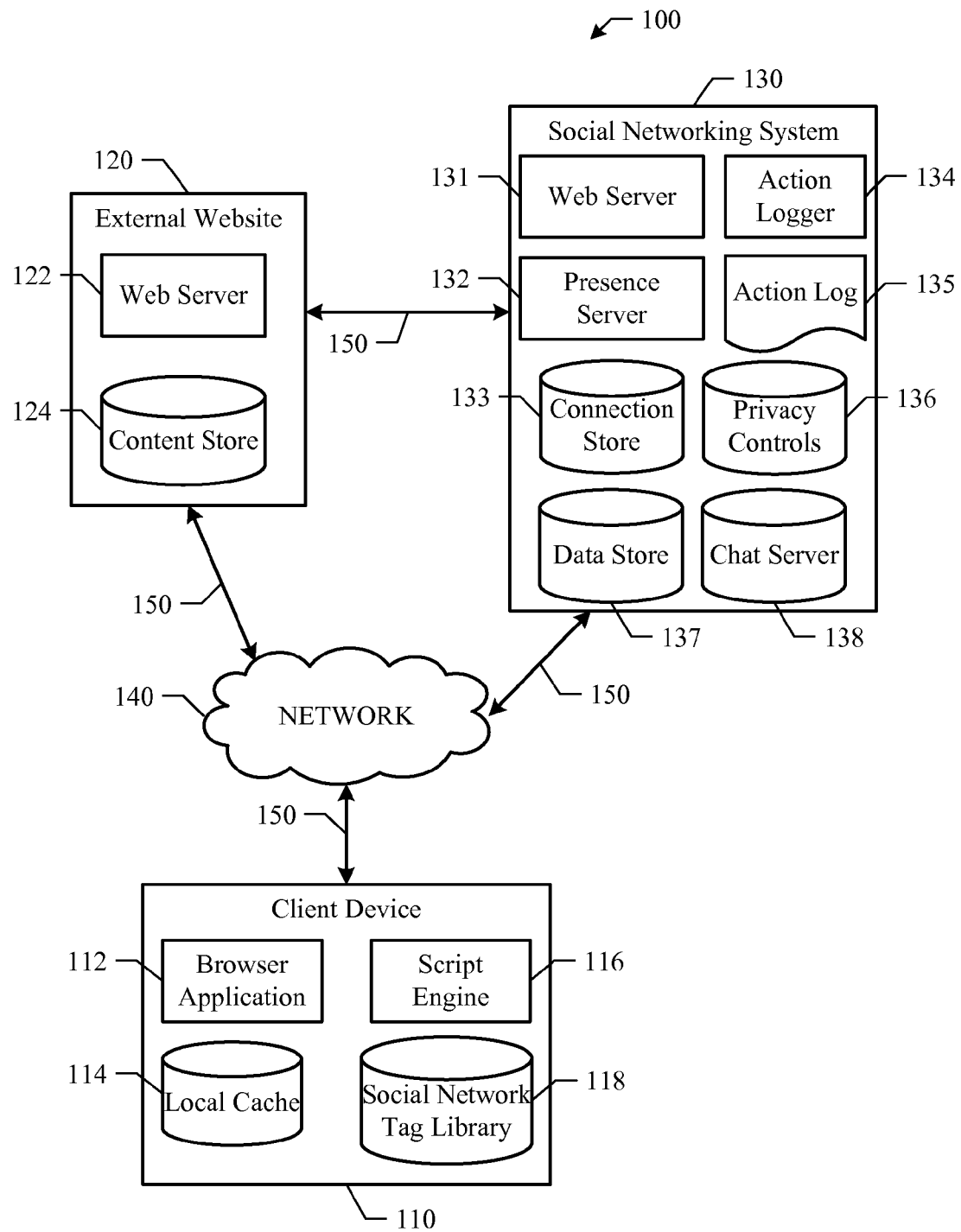
FIG. 1 illustrates an example system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Social Network Systems and Accessible User Profile Data

A social networking system, such as a social networking website, enables its users to interact with it, and with each other, through the system. Typically, to become a registered user of a social networking system, an entity, either human or non-human, registers for an account with the social networking system. Thereafter, the registered user may login to the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile," in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends.

A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

In particular embodiments, an edge may be one of a plurality of edge types based at least in part on the types of nodes that the edge connects in the social graph. In particular embodiments, for example, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In particular embodiments, the edge itself may store, or be stored with, data that defines a type of connection between the pair of nodes the edge connects. In particular embodiments, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other particular embodiments, data that may indicate the type of connection or relationship between nodes connected by an edge may be stored with the nodes themselves. Additional information on automatic edge generation in an integrated social graph is described in U.S. patent application Ser. No. 12/763,145, which is incorporated by reference herein for all purposes.

Similar to user profile pages, concept profile pages ("hubs") share information related to the concept associated with the corresponding hub node. In particular embodiments, any registered user logged in to social networking system and viewing a hub may add content to the hub similar to a wiki-site. A hub may also generally include a basic information section, a detailed info section, as well as, potentially, other sections, any and all of which may generally be filled in by any user viewing the hub. In particular embodiments, wall (or news feed/activities feed) section, or other feed or activities section of the hub, displays comments, status updates, wall posts and other user activities associated with the user and friends of the user that are viewing the hub. The wall (or news feed/activities feed) section, or other feed or activities section of the hub may also display comments, status updates, wall posts and other user activities and user generated content that are related to the concept for which the hub was created. A hub may also include a photo or picture section under photos tab allowing users to upload images in or related to the concept, one of which may be selected as a profile picture for the hub.

In particular embodiments, user nodes and hub nodes stored in the social graph database may be connected with one another via edges. In particular embodiments, each edge may be classified or characterized by an edge type of a plurality of edge types that define, indicate, or characterize the connection between the pair of nodes connected by the edge. In particular embodiments, edges define friendship or other social relationship connections between users (e.g., friends) associated with the respective user nodes.

FIG. 1 illustrates a particular embodiment of a system that includes a client device 110, an external website 120, and a social networking system 130. In particular embodiments, links 150 illustrate interactions between client device 110 and external website 120, between client device 110 and social networking system 130, and between external website 120 and social networking system 130.

Client device 110 is generally a computer or computing device including functionality for communicating over a computer network (e.g., remotely). Client device 110 may be a desktop computer, laptop computer, personal digital assistant (PDA), in- or out-of-car navigation system, smart phone or other cellular or mobile phone, or mobile gaming device, among other suitable mobile computing devices. Client device 110 may execute one or more client applications, such as a web browser (e.g., Microsoft Windows Internet Explorer, Mozilla Firefox, Apple Safari, Google Chrome, and Opera, etc.), to access and view content over a computer network.

In particular embodiments, client device 110 may host a browser application 112 or other application that processes and renders structured documents. In particular embodiments, client device 110 may have received one or more structured documents from external website 120 and/or social networking system 130. In particular embodiments, the structured document may be a markup language document that contains text, links, scripts, and other attributes, such as API calls identifying social network data elements of a user profile maintained by social networking system 130. In particular embodiments, the structured document may contain instructions, for example, to specify how to render content for display at client device 110. In particular embodiments, the structured document may contain instructions, for example, on how to access additional information from social networking system 130. Alternatively, the instructions within structured document may contain program logic interpreted by a scripting engine 116 on the client device 110.

In particular embodiments, browser application 112 may process the markup language in the structured document and render the structured document as a displayable web page. In particular embodiments, the displayable web page may include content of the external website 120 as well as one or more of the located social network data elements of the social networking system 130. In particular embodiments, browser application 112 may display the rendered web page on a display of client device 110. For example, a structured document hosted by external website 120 may contain an API call for a profile picture of a user. The browser application 112, when processing the structured document, may transmit a request to social networking system 130 to retrieve the user's profile picture. The request may be an HTTP request and may further include a browser cookie with information identifying the user of social networking system 130. The browser cookie may include state and other information indicating the status of the user, for example, whether the user has recently logged in and/or authenticated to the social networking system 130. Still further, the structured document provided by external website 120 may include a segment (such as a div or iframe) that prompts the user to log in to social network system 130. For example, the structured document may include HTML code, Javascript and other controls that cause the browser hosted by client device 110 to access social networking system 130 and render a login interface in a section of the displayed structured document.

In particular embodiments, external website 120 may be any website accessible on the Internet, and may have various formats, such as, for example and without limitation, text, audio, video, images, web pages, documents, executables, etc. Examples of external website 120 that provides audio content includes, but is not limited to, PANDORA (www.pandora.com), or RHAPSODY (www.rhapsody.com), etc. Examples of external website 120 that provide video or other content include, but are not limited to, HULU (www.hulu.com), YOUTUBE (www.youtube.com), or THE NEW YORK TIMES (www.nytimes.com), etc. In particular embodiments, external website 120 and its contents may be stored at many different sites, such as on computers and servers, in databases, etc., around the world. These different sites are communicatively linked to the Internet through various network infrastructures and the Uniform Resource Locator (URL) of external website 120 specifies where the corresponding document is located and the mechanism for retrieving it. An person may access the publicly available external website 120 or its contents via a suitable network device (e.g., a computer, a smart mobile telephone, etc.) connected to the Internet.

In particular embodiments external website 120 and social networking system 130 may have one or more users or members. In particular embodiments, users of external website 120 may also be users of social networking system 130. In particular embodiments, a user may interact with external website 120 and/or the social networking system 130 using client device 110. In particular embodiments, the social networking system 130 may keep user profile information and the connections among the users.

In particular embodiments, the social networking system 130 may receive requests from either the external website 120 or the client device 110 to which the social networking system 130 may respond with the requested information or with a subset of the requested information. Particular interactions between client device 110, the external website 120, and the social networking system 130 and information exchanged between the three systems will be described later in detail.

In particular embodiments, social networking system 130 may include a web server 131, a presence server 132, an action logger 134, an action log 135, a connection database 133, a privacy controls database 136, data store 137, and chat server 138. In particular embodiments, social networking system 130 may include additional, fewer, or different modules for various applications. Conventional components such as network interfaces, security mechanisms, load balancers, failover servers, management and network operations consoles, and the like are not shown so as to not obscure the details of the system. In particular embodiments, the social networking system 130 comprises a computing system that allows users to communicate or otherwise interact with each other and access content as described herein. In particular embodiments, social networking system 130 further includes a chat server 138 operative to maintain presence information for one or more users and to provide chat functionality allowing users to communicate messages in a chat or instant messaging session.

In particular embodiments, the social networking system 130 stores data describing one or more connections between different users in the connection database 133. Particular embodiments of the connection database 133 may store connection information for users who have indicated similar or common work experience, group memberships, hobbies, or educational history. In particular embodiments, the social networking system 130 may also include user-defined connections between different users and those connections may be stored in connection database 133 as well. Particular embodiments of connection database 133 may allow users to specify their relationships with other users. In particular embodiments, for example, these user defined connections allows users to generate relationships with other users that parallel the users' real-life relationships, such as friends, relatives, co-workers, partners, and so forth. In particular embodiments, users may select from predefined types of connections, or define their own connection types, as needed.

In particular embodiments, the web server 131 links the social networking system 130 via the network 140 to one or more client devices 110. Network 140 generally represents a network or collection of networks (such as the Internet or a corporate intranet, or a combination of both) over which client devices 110 may access the external website 120 and the social network system 130. In particular embodiments, the web server 131 serves web pages, as well as other web-related content, such as Java, Flash, XML, and so forth. Particular embodiments of the web server 131 may include a mail server or other messaging functionality for receiving and routing messages between the social networking system 131 and the client devices 110. In particular embodiments, the messages may be instant messages, queued messages (e.g., email), text and SMS messages, or any other suitable messaging technique.

In particular embodiments, the action logger 134 is capable of receiving communications from the web server 131 about user actions on and/or off the social networking system 130. In particular embodiments, the action logger 134 populates the action log 135 with information about user actions in order to track them. More specifically, any action that a particular user takes with respect to another user is associated with each user's profile through information maintained in a database or other data repository, such as the action log 135. In particular embodiments, the actions taken by the members that are recorded in the action log 135 may be actions taken by the members on the social networking system 130 or actions taken by the members on the external website 120. In particular embodiments, the actions taken by the members on an external website 120 are communicated to the web server 131 and the web server 131 sends a request to the action logger 134 to record the actions in the action log 135. In particular embodiments, such actions may include, for example, adding a connection to the other user, sending a message to the other user, reading a message from the other user, viewing content associated with the other user, attending an event posted by another user, among others. Additionally, in particular embodiments, actions in connection with other objects may be directed at particular users, and these actions may be associated with those users as well.

In particular embodiments, when a user takes an action on the social networking system 130, the action is recorded in an action log 135. In particular embodiments, the social networking system 130 maintains the action log 135 as a database of entries. In particular embodiments, when an action is taken on the social networking system 130, the social networking system 130 adds an entry for that action to the action log 135.

In particular embodiments, a user of the social networking system may share media hosted by external websites with the social networking system and this action may be received by action logger 134 and stored in action log 135. In particular embodiments, external websites may have "share" buttons that are operative to transmit links to the content to the social networking system and post the links as wall post entries for a user profile. In particular embodiments, the buttons are operative to transmit activity stream entries to the social networking system, which will post the entry in a news feed. In particular embodiments, for example, a user can access a photo, a photo album, a video clip, or other media from a client device 110 and post links to that content on the wall associated with a user profile on social networking system.

In particular embodiments, presence server 132 maintains data pertaining to user presence received by external website 120 and social networking system 130. In particular embodiments, when users of the social networking system 130 are accessing one or more external websites 120, a social browser extension may continuously send asynchronous messages to the social networking system 130, notifying the social networking system that the user is present and accessing one or more external websites 120. In particular embodiments, once these messages are received by social networking system 130, they are then stored in presence server 132. In particular embodiments, the social browser may continuously send asynchronous messages to the social networking system 130 at particular time intervals, such as every 30 s, 1 min, 5 min, and so on. In particular embodiments, the user may specify that they are "online." In particular embodiments, the user may select preferences for whether their presence information is transmitted to the social networking system. In particular embodiments, one or more aspects of the user's privacy settings may be stored locally (and/or synchronized with privacy controls database 136) at the browser application in the client device to obviate the need for remote access.

In particular embodiments, privacy controls database 136 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy controls database 136. In particular embodiments, a user's privacy data may comprise privacy settings associated with any aspect of the user profile, including changes that the user makes to the user profile, events, locations, media, activities, connections between one or more users, the news feed associated with the user or any other action that the user takes in the social networking system. In particular embodiments, the privacy settings associated with the privacy controls database 136 may be provided and stored at different levels of granularity. In particular embodiments, for example, the information to be shared may be specific information, such as, work phone number, or a set of related information, such as, personal information including several pieces of related information including profile photo, home phone number, and status. Alternatively, in particular embodiments, the privacy settings associated with the privacy controls database 136 may apply to all the information associated with the user in the social networking system.

In particular embodiments, the specification of the set of entities that may access particular user information may also be specified at various levels of granularity. In particular embodiments, the user may specify any number of entities with which information may be shared. In particular embodiments, sets of entities with which information may be shared may include, for example, specified friends of the user, all friends of the user, all friends of friends, all applications, and all external systems. In particular embodiments, for example, the user may provide a list of external systems that may access certain information as well. In particular embodiments, may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in privacy controls database 136. Particular embodiments contemplate various combinations of granularity of permitted access or denial of access depending on the type of user information and sets of entities with which information may be shared or accessed by the sets of entities, as specified by the user and stored in the privacy controls database 136.

In particular embodiments, an authorization server may enforce the privacy settings of the users of the social networking system, such as described above with respect to the privacy policy. In particular embodiments, the privacy setting of a user determines how particular information associated with a user may be shared. In particular embodiments, as described above, the privacy controls database 136 comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that can potentially access the information. In particular embodiments, the information that may be shared by a user may comprise any aspect of the user profile, events, locations, media, activities, or the news feed associated with the user. Privacy settings may also be configured to allow users to control the extent to which information concerning a user's browsing activities may be shared with other users. In particular embodiments, for example, a user may configure the user's privacy settings to limit sharing of the user's browsing activity information to first-degree contacts of the user, or a custom-defined group of users. In particular embodiments, a user may also limit the sharing of browsing activity information by excluding a user's browsing activity relative to certain domains, times of day, and the like.

Particular embodiments relate to a plug-in software application (hereinafter referred to as "social browser extension") that operates or executes in the context of a browser (e.g., a web browser) or other application client that consumes structured documents. In particular embodiments, the functionality described herein may be incorporated directly into a browser client application, as opposed to being a plug-in. In either embodiment, the social browser extension may be implemented as one or more software modules that are operative to cause a processor and computing device to perform the operations recited herein.

Dynamic Chat Box

Particular embodiments describe a dynamically generated chat box that facilitates communication between two or more users of a social networking system who are concurrently accessing a structured document. In particular embodiments, the social browser extension records click-stream activity for users that have accessed a structured document and transmits data representing the click-stream activity to the social networking system. This click-stream activity and social graph information may be used to enhance the user's browsing experience by dynamically suggesting a chat between a first user and other users that may be concurrently accessing (or who may have recently accessed) a particular document and/or the same web domain. In particular embodiments, the social browser extension corresponding to a first user may also query the social networking system based on the currently accessed domain and/or URL (and optionally, the references and objects identified in the page), to determine whether there are other users concurrently accessing a particular content object, or who have accessed a particular content object within a threshold window of time. In particular embodiments, if one or more other users has been identified, a chat messaging interface may be displayed to the first user. In particular embodiments, the chat messaging interface displayed to the first user has controls that allow the first user to establish a chat session with a second user.

Figure 2:
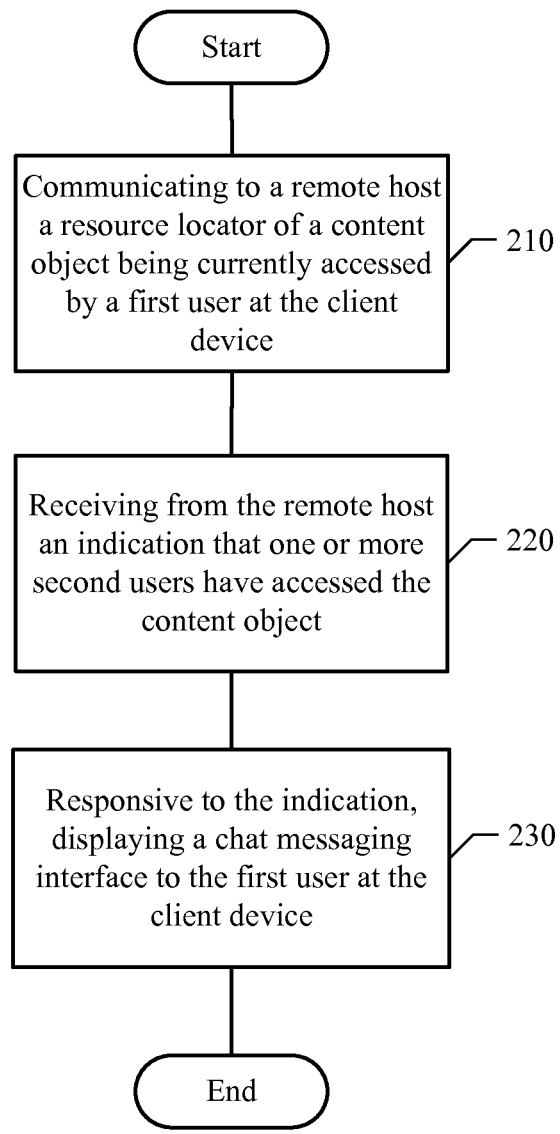
FIG. 2 is a flow chart illustrating an example method.

FIG. 2 is a flow chart illustrating a method for creating a dynamic chat box between two or more users of a social networking system who are accessing a third party website from a client device. Particular embodiments communicate, from a client device to the social networking system, a resource locator of a content object being currently accessed by a first user at the client device, as illustrated in step 210. For example, if implementations involving a browser plug-in, the plug-in may use APIs supported by the browser to identify the resource locator of the structured document currently loaded into the browser.

In particular embodiments, when a user accesses a structured document of external website 120 through a client device 110, the social browser extension may record click-stream activity for the user accessing the structured document and communicates the click-stream data to social networking system 130 where social networking data stores the data in data store 137 and the data is added to the social graph. In particular embodiments, the social browser extension transmits click-stream data for users accessing the structured document.

In particular embodiments, for example, social browser extension communicates click-stream data to social networking system 130 in real time as the user is accessing the structured document. In particular embodiments, the click events taking place on external website 120 may indicate relationships between various objects, such as a user interacting with a structured document. In particular embodiments, data store 137 may store the URL of the structured document that a user is accessing, the userID of the user interacting with the structured document who is also a user of the social networking system 130, and a time stamp representing when the structured document was accessed.

In particular embodiments, if a user interacts with the same structured document at a later time, the old time stamp may be updated to the current time to represent that the user is currently interacting with the structured document. In particular embodiments, for example, data store 137 may store the real time click-stream data in a hash table or any other optimized method for storing large amounts of real time click-stream data. In particular embodiments, for example social networking system 130 may index the real time click-stream data using relationships in the social graph. In particular embodiments, the indices enable the social networking system 130 to efficiently process the real time click-stream data. In particular embodiments, data store 137 stores real time click-stream data for all time.

In particular embodiments, for example, one or more users may be accessing the an article on the New York Times' website at http://www.nytimes.com, such as http://www.nytimes.com/2011/04/13/science/space/13shuttle.html?hp. In particular embodiments, for each user accessing this structured document at the New York Times' website, click-stream data comprising each userID, the URL of the structured document, and a time stamp representing the current time may be sent to the social networking system.

Particular embodiments may receive from the remote host an indication that one or more second users have accessed the content object, as illustrated in step 220. Particular embodiments of the social browser extension may query the social networking system to determine if any second users have accessed or are concurrently interacting with the displayed structured document. In particular embodiments, the second user may be any one of the first user's first (and possibly second degree) contacts or associations. In particular embodiments, for example, the current user ID and the URL of the currently loaded page may be queried. And particular embodiments, for example, may query the social networking system for the presence of the second user at the currently loaded URL of the displayed structured document.

In particular embodiments, the social browser extension queries the social networking system for the user ID of the first user who have viewed a structured document. In particular embodiments for example, the query may be, for example, a userID, a URL, and t, where $t=T_C-T$; Where $T_C$=Current Time and T=30 s, 1 min, 5 min, or any other particular interval of time to infinity. In particular embodiments, the userID queried may be an exact match of the current userID or a partial match of the current userID. In particular embodiments, the query string for the URL may be the entirety of the URL currently being viewed, such as the scheme, host, and path. In particular embodiments, the query string for the URL may be only the scheme and host for the URL currently being viewed. In particular embodiments, t indicates a particular time in the past as a method of restricting the amount of click-stream data that is returned. In particular embodiments, for example, if a user is currently viewing a structured document, the click-stream data farther back in time, for example 30 min in the past, may be less relevant to the user than click-stream data going back 5 min. In particular embodiments, for example, click-stream data may be returned for second users concurrently viewing the structured document.

In particular embodiments, the social browser extension may receive from the social networking system an indication that one or more second users are currently present. In particular embodiments, the social browser extension may query the social networking system to determine presence of the one or more second users. As described above, in particular embodiments, the presence server 132 may have data for the presence information for the one or more users. In particular embodiments, the social networking system may then transmit the presence information for the one or more second users to the social browser extension.

In particular embodiments, once the click-stream data has been recorded, queried, and results are returned to the social browser application, the social browser extension may modify the web page to display a chat messaging interface to the first user at the client device. Particular embodiments, responsive to the indication, display a chat messaging interface to the first user at the client device, as illustrated in step 230. In particular embodiments, the chat messaging interface includes identifiers for the one or more second users and messaging controls operative to establish a chat session with the one or more second users. In particular embodiments, the chat interface may be a pop-up or an overlay.

In particular embodiments, in order to modify the structured document, the social browser extension accesses the Document Object Model (DOM) (or other suitable) representation of the currently rendered structured document generated by the web browser. In particular embodiments, the social browser extension may modify, or cause to be modified the DOM representation of the target webpage (without necessarily modifying the native HTML or other markup language cone or content transmitted to the browser for rendering the target webpage (which is generally stored separately)) to indicate that the objects within the structured document have been accessed by one or more second users. In particular embodiments, the modified DOM representation may display the chat messaging interface as a sidebar or as an overlay panel. In particular embodiments, the chat messaging interface may display the one or more second users or the messaging controls as highlighted, colored, bolded, or any other such modification that would indicate that the one or more second users are concurrently accessing the content object. In particular embodiments, the chat messaging interface may display second users who have accessed the current URL or are currently accessing the current URL. In particular embodiments, the chat messaging interface may indicate whether the one or more second users are presently online or offline. In particular embodiments, the chat messaging interface may update the display to include the real time data for users concurrently accessing the current URL.

In particular embodiments, when the first user establishes a chat session with one or more of the second users, the two or more users may then communicate with each other. In particular embodiments, the chat session comprises one or More of text, video, or voice. Particular embodiments of a chat session may refer to any kind of communication over the Internet. In particular embodiments, a chat session may be primarily direct one-to-one chat or text-based group chat.

In particular embodiments, the social browser extension may optionally include an option for scanning the contents of a structured document, query the contents of the structured document, determine presence information, and display an overlay or popup that contains information on friends who are online now and accessing particular contents of a structured document. In particular embodiments, for example, social browser extension communicates click-stream data to social networking system 130 in real time as the user is accessing particular objects within the structured document itself. In particular embodiments, the social browser extension records click-stream activity for users that have interacted with objects and references of the displayed structured document and transmits data representing the click-stream activity to the social networking system where it is stored within the social graph. In particular embodiments, the social browser extension may query the social networking system and accesses the social graph data to determine if any second users having an association with the first user in the social graph are concurrently interacting with a content object of the displayed structured document. In particular embodiments, the social browser extension may query object or references within the structured document at the specified URL in addition to the URL itself that are concurrently being accessed.

Figure 3:
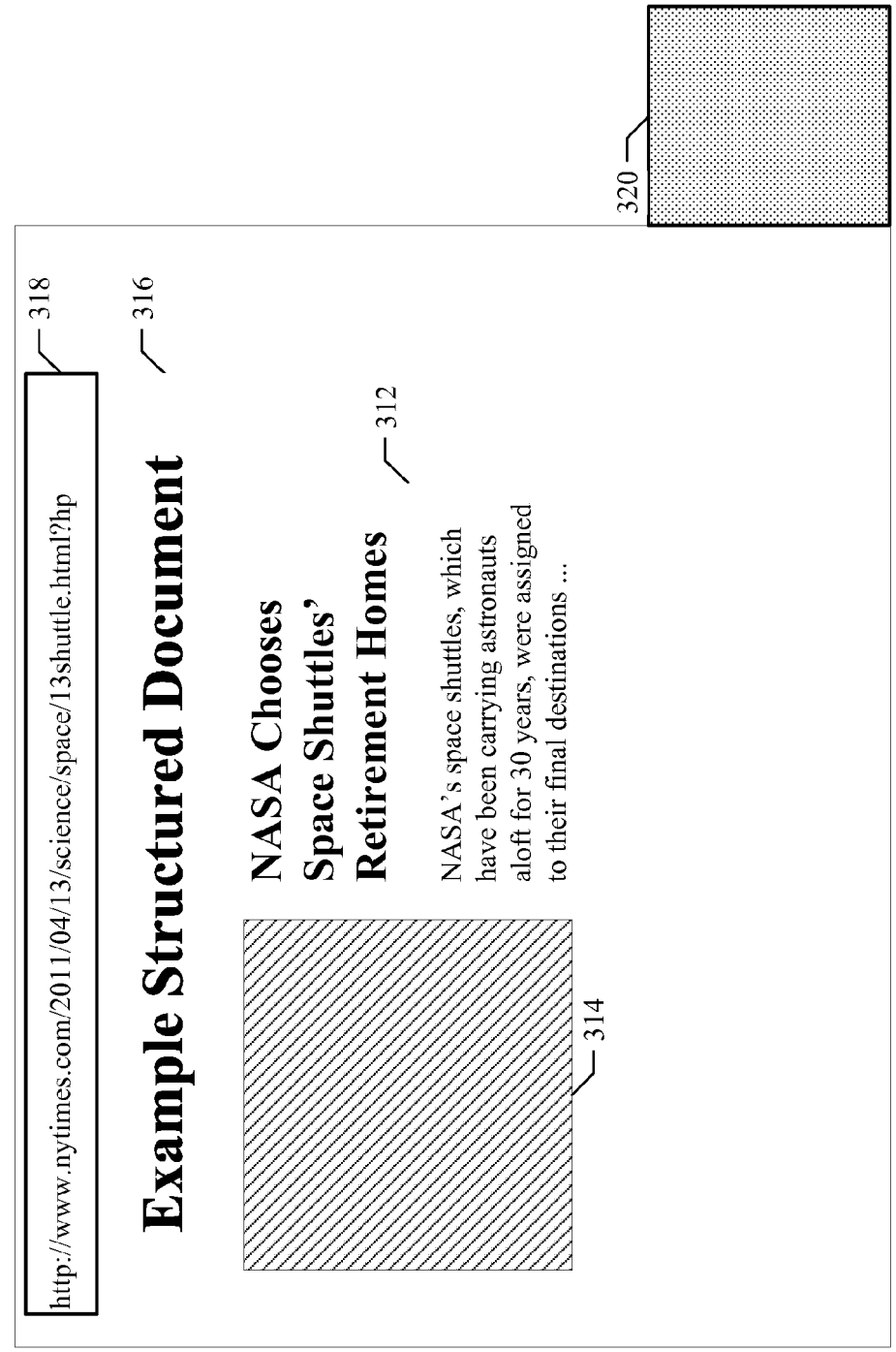
FIG. 3 illustrates an example structured document.

FIG. 3 illustrates an example structured document 300 that may be hosted by an external website 120. Within the structured document 300, there may be one or more objects 312, 314, 316. Structured document 300 may be located at the URL displayed in address box 318. In particular embodiments, for example, a user may be viewing "http://www.nytimes.com/2011/04/13/science/space/13shuttle.html?hp," the URL displayed in address box 318.

In particular embodiments, HTML may enable a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. The web browser obtains the required resources (e.g., in response to executing JavaScripts or other calls embedded in a requested and received structured document and which may include HTML or XML code and/or JavaScript scripts and/or content including text, audio, and video) for rendering the webpage from one or more servers and then constructs a browser representation of the webpage. Other common web browser-supported languages and technologies include the Extensible Markup Language (XML), the Extensible Hypertext Markup Language (XHTML), JavaScript, Cascading Style Sheet (CSS), and, frequently, Java. In particular embodiments, the browser processes the structured document and creates an in-memory representation of the document. The representation may be a DOM representation of the webpage. The web browser then renders the page in the particular client viewing window of the browser utilizing the DOM (or other suitable) representation.

Typically, a web browser is used to access a webpage (or other structured document) for rendering at a client device. A web browser extension is generally a computer program configured to run on a user's computing device (e.g., client device 110) that enables the user to connect to various server-hosted web pages available over a network. A non-exhaustive set of common web browsers include, by way of example, Internet Explorer™, Firefox™, Safari™, and Opera™. The web browser provides a standard viewing window that displays the informational and visual content of the webpage or website (the term "website" and "webpage" may be used interchangeably herein where appropriate). As illustrated in FIG. 3, the URL of the website presently being rendered and viewed is displayed in the address box 318 of the web browser GUI. The address box enables a user to input an address (e.g., a URL) for a desired (target) webpage. The content of the website generally includes graphical images, text, and/or hyperlinks (e.g., comprising code segments that redirect the web browser and user to another portion of the webpage or to a subsequent webpage altogether without requiring manual input of the subsequent webpage's address), such as objects 312, 314, 316. In various example embodiments, the webpage can also include audio, video, and other types of web content, and they may also be present as objects 312, 314, 316. To facilitate navigation of the rendered page, the web browser GUI may include scrolling bars or buttons. By clicking and/or dragging these bars or buttons, a user may selectively view other portions of the webpage, which do not entirely fit the immediately viewable areas of the GUI rendered by the web browser.

In particular embodiments, as illustrated in FIG. 3, the display on the example structured document 300 may be modified either by Javascript control or a social browser extension to display interface 320. In particular embodiments, interface 320 may be displayed when two users, who are related on the social graph, are concurrently accessing example structured document 300. Particular embodiments of interface 320 may be a list of second users who are concurrently accessing example structured document 300, or who are currently accessing the same domain of which structured document 300 represents one path within the domain. In particular embodiments, interface 320 may display an indication whether the one or more second users are present or currently available for chatting. In particular embodiments, interface 320 may display any social network data elements of the user profile of each of the one or more second users. As described above, various information is provided by the user when registering with the social networking system. In particular embodiments, any profile information associated with each one or more second users may be displayed in interface 320 such as the second user's profile picture, contact information, birth date, gender, marital status, family status, employment, educational background, preferences, interests, and other demographical information, including social graph data that the second user has generating as a result of accessing or interacting with the example structured document 300 itself or with any of the objects and references within example structured document 300.

Figure 4:
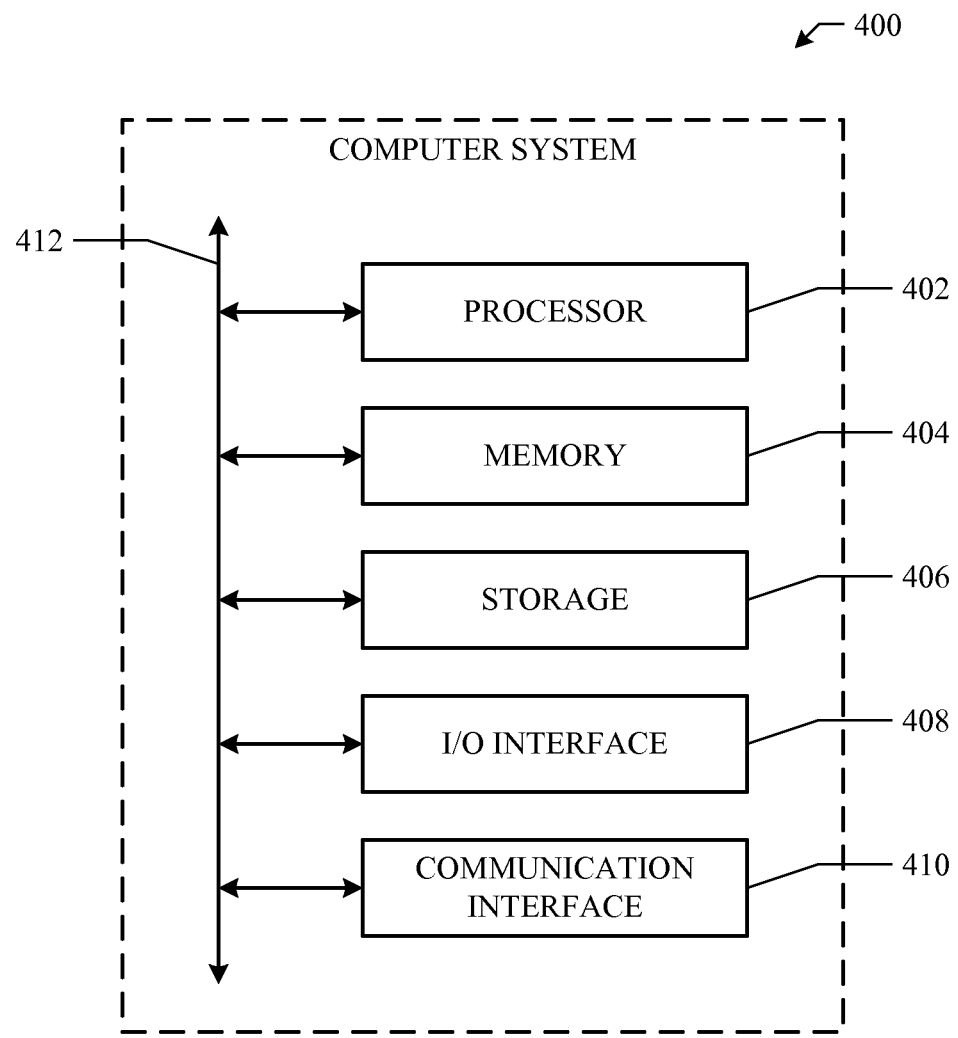
FIG. 4 illustrates an example computer system.

Particular embodiments may be implemented on one or more computer systems. FIG. 4 illustrates an example computer system 400 that may be used to implement a host, such as a server, client desktop computer or mobile device, that executes the functionality described above. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:
1. A method comprising:
  by a client device of a first user, sending to a remote host associated with a social-networking system that comprises a graph that comprises nodes and edges connecting the nodes, at least one or more of the nodes corresponding to the first user, at least one or more of the nodes corresponding to each of one or more second users:
   a resource locator of a content object accessed by the first user, wherein the content object accessed by the first user is one of a plurality of content objects within a structured document displayed as a web page, and
   real time click-stream data indicative of the first user accessing one or more other content objects associated with the content object, each of the one or more other content objects having a timestamp within a time interval, wherein the time interval begins at a time specified by the remote host;
by the client device, receiving from the remote host an indication that one or more of the second users have accessed or are accessing the content object accessed by the first user, wherein:
   the one or more of the second users are determined by the remote host to be connected to the first user within the social-networking system; and
   the indication that the one or more of the second users have accessed or are accessing the content object comprises social-networking information within the social-networking system corresponding to the second users; and
by the client device, responsive to the indication, modifying a representation of the web page to provide a messaging interface to the first user that comprises:
   one or more identifiers that are each associated with one or more of the second users;
   data generated by the second users as a result of having accessed or accessing the content object accessed by the first user;
   messaging controls operative to establish a messaging session with one or more of the second users; and
   at least some of the social-networking information of each of one or more of the second users.

2. The method of claim 1, wherein access of the content object by the first user comprises:
the content object being displayed on the client device to the first user; or
the first user interacting with the content object.

3. The method of claim 2, wherein the first user interacting with the content object comprises the first user clicking on the content object.

4. The method of claim 1, wherein modifying the representation of the web page comprises modifying a Document Object Model (DOM) representation of the web page for rendering the web page on the client device.

5. The method of claim 1, wherein the messaging session comprises one or more of text, video, or voice.

6. A system comprising:
one or more processors; and
a memory coupled to the processors comprising instructions executable by the processors, the processors being operable when executing the instructions to:
   by a client device of a first user, send to a remote host associated with a social-networking system that comprises a graph that comprises nodes and edges connecting the nodes, at least one or more of the nodes corresponding to the first user, at least one or more of the nodes corresponding to each of one or more second users:
     a resource locator of a content object accessed by the first user, wherein the content object accessed by the first user is one of a plurality of content objects within a structured document displayed as a web page, and
     real time click-stream data indicative of the first user accessing one or more other content objects associated with the content object, each of the one or more other content objects having a timestamp within a time interval, wherein the time interval begins at a time specified by the remote host;
   by the client device, receive from the remote host an indication that one or more of the second users have accessed or are accessing the content object accessed by the first user, wherein:
     the one or more of the second users are determined by the remote host to be connected to the first user within the social-networking system; and
     the indication that the one or more of the second users have accessed or are accessing the content object comprises social-networking information within the social-networking system corresponding to the second users; and
   by the client device, responsive to the indication, modify a representation of the web page to provide a messaging interface to the first user that comprises:
     one or more identifiers that are each associated with one or more of the second users;
     data generated by the second users as a result of having accessed or accessing the content object accessed by the first user;
     messaging controls operative to establish a messaging session with one or more of the second users; and
     at least some of the social-networking information of each of one or more of the second users.

7. The system of claim 6, wherein access of the content object by the first user comprises:
the content object being displayed on the client device to the first user; or
the first user interacting with the content object.

8. The system of claim 7, wherein the first user interacting with the content object comprises the first user clicking on the content object.

9. The system of claim 6, wherein modifying the representation of the web page comprises modifying a Document Object Model (DOM) representation of the web page for rendering the web page on the client device.

10. One or more computer-readable non-transitory storage media embodying software that is operable when executed to:
by a client device of a first user, send to a remote host associated with a social-networking system that comprises a graph that comprises nodes and edges connecting the nodes, at least one or more of the nodes corresponding to the first user, at least one or more of the nodes corresponding to each of one or more second users:
   a resource locator of a content object accessed by the first user, wherein the content object accessed by the first user is one of a plurality of content objects within a structured document displayed as a web page, and
   real time click-stream data indicative of the first user accessing one or more other content objects associated with the content object, each of the one or more other content objects having a timestamp within a time interval, wherein the time interval begins at a time specified by the remote host;

by the client device, receive from the remote host an indication that one or more of the second users have accessed or are accessing the content object accessed by the first user, wherein:
- the one or more of the second users are determined by the remote host to be connected to the first user within the social-networking system; and
- the indication that the one or more of the second users have accessed or are accessing the content object comprises social-networking information within the social-networking system corresponding to the second users; and by the client device, responsive to the indication, modify a representation of the web page to provide a messaging interface to the first user that comprises:
- one or more identifiers that are each associated with one or more of the second users;
- data generated by the second users as a result of having accessed or accessing the content object accessed by the first user;
- messaging controls operative to establish a messaging session with one or more of the second users; and
- at least some of the social-networking information of each of one or more of the second users.

11. The media of claim 10, wherein access of the content object by the first user comprises:
- the content object being displayed on the client device to the first user; or
- the first user interacting with the content object.

12. The media of claim 11, wherein the first user interacting with the content object comprises the first user clicking on the content object.

13. The media of claim 10, wherein modifying the representation of the web page comprises modifying a Document Object Model (DOM) representation of the web page for rendering the web page on the client device.

14. The method of claim 4, wherein the modified DOM representation of the web page displays the messaging interface as a side bar or an overlay panel.

15. The method of claim 4, wherein the data generated by the second users that comprises the modified DOM representation comprises real-time data for one or more of the second users who are accessing the content object accessed by the first user.

16. The system of claim 6, wherein the messaging session comprises one or more of text, video, or voice.

17. The system of claim 9, wherein the modified DOM representation of the web page displays the messaging interface as a side bar or an overlay panel.

18. The system of claim 9, wherein the data generated by the second users that comprises the modified DOM representation comprises real-time data for one or more of the second users who are accessing the content object accessed by the first user.

19. The media of claim 10, wherein the messaging session comprises one or more of text, video, or voice.

20. The media of claim 13, wherein the modified DOM representation of the web page displays the messaging interface as a side bar or an overlay panel.

21. The media of claim 13, wherein the data generated by the second users that comprises the modified DOM representation comprises real-time data for one or more of the second users who are accessing the content object accessed by the first user.

* * * * *